(12) United States Patent
Ruetter et al.

(10) Patent No.: US 6,955,201 B2
(45) Date of Patent: Oct. 18, 2005

(54) SYSTEM FOR SUPPLYING PRESSURIZED AIR TO A VEHICLE TIRE THROUGH THE HUB OF THE WHEEL

(75) Inventors: Andreas Ruetter, Pinerolo (IT); Luca Zavaglia, Rivoli (IT); Michele Musso, Rosta (IT); Marco Brunetti, Turin (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/436,831

(22) Filed: May 13, 2003

(65) Prior Publication Data

US 2003/0217798 A1 Nov. 27, 2003

(30) Foreign Application Priority Data

May 24, 2002 (IT) ..................................... TO2002A0442

(51) Int. Cl.[7] .............................................. B60C 23/10
(52) U.S. Cl. ........................................ 152/417; 152/415
(58) Field of Search ................................. 152/415–417

(56) References Cited

U.S. PATENT DOCUMENTS

| | | | |
|---|---|---|---|
| 2,177,042 A | | 10/1939 | Michael |
| 4,730,656 A | | 3/1988 | Goodell et al. |
| 4,844,138 A | | 7/1989 | Kokubu |
| 4,932,451 A | * | 6/1990 | Williams et al. ............ 152/417 |
| 5,080,156 A | | 1/1992 | Bartos |
| 5,221,381 A | | 6/1993 | Hurrell, II |
| 5,484,213 A | * | 1/1996 | Caillaut et al. ............. 384/486 |
| 5,503,480 A | | 4/1996 | Caillaut et al. |
| 5,587,698 A | * | 12/1996 | Genna .......................... 340/442 |
| 6,170,628 B1 | * | 1/2001 | Bigley ....................... 192/69.41 |
| 6,199,611 B1 | * | 3/2001 | Wernick ....................... 152/417 |
| 6,325,123 B1 | * | 12/2001 | Gao et al. ..................... 152/416 |
| 6,575,269 B1 | * | 6/2003 | Skoff et al. ................... 184/5.1 |
| 6,668,888 B1 | * | 12/2003 | Beesley et al. ............... 152/417 |
| 2003/0217798 A1 | | 11/2003 | Ruettner et al. |

FOREIGN PATENT DOCUMENTS

| | | |
|---|---|---|
| DE | 3738529 | 10/1988 |
| EP | 0 208 540 | 7/1986 |
| EP | 000410723 A1 * | 1/1991 |
| EP | 0 521 719 | 7/1992 |
| EP | 0 656 267 A1 | 1/1996 |
| EP | 0 713 021 A1 | 7/1997 |
| FR | 2 714 943 | 7/1995 |
| GB | 2178705 * | 2/1987 |
| GB | 2 223 207 | 4/1990 |

* cited by examiner

*Primary Examiner*—Russell D. Stormer
(74) *Attorney, Agent, or Firm*—Merchant & Gould P.C.

(57) ABSTRACT

A hollow suspension standard (20) of a vehicle equipped with a system for supplying pressurized air to a tire through the hub of the wheel has an inner cavity (22) and a seat (21) for housing a wheel hub bearing unit (10). The standard (20) forms a first passage (23) for establishing fluid communication between the inner cavity (22) and the hub-bearing unit (10), and a second passage (24) establishing fluid communication between the inner cavity (22) and a source of pressurized air mounted on board of the vehicle.

3 Claims, 1 Drawing Sheet

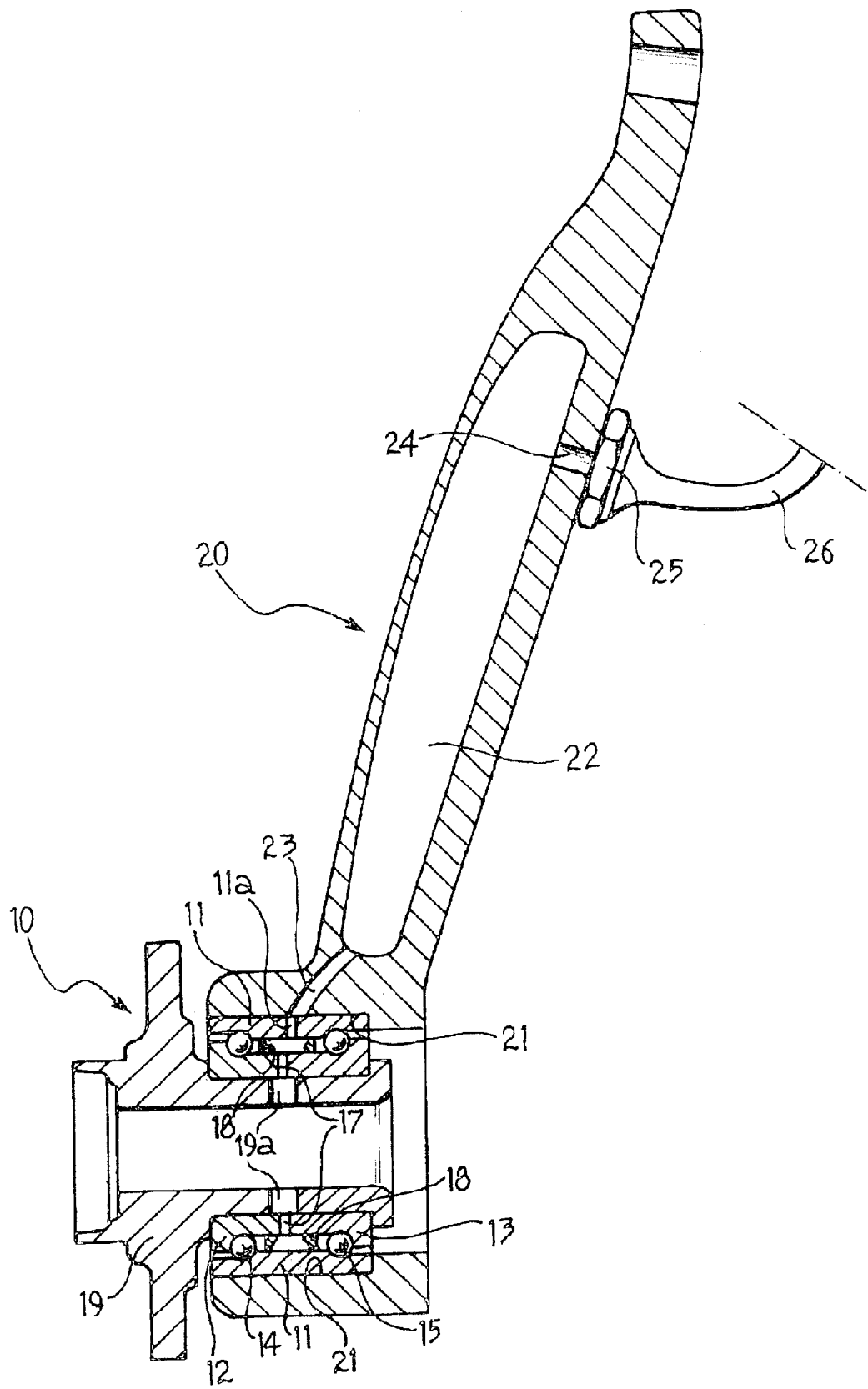

SYSTEM FOR SUPPLYING PRESSURIZED AIR TO A VEHICLE TIRE THROUGH THE HUB OF THE WHEEL

The present invention refers to a system for supplying pressurized air to a vehicle tire through a wheel hub. The invention further relates to a suspension standard for a vehicle equipped with a system for supplying pressurized air to a tire through the hub of a wheel.

There are known bearing units for a vehicle wheel hub provided with special vents and sealing devices for blowing into the tire air pressurized by a source of pressurized air mounted on board of the vehicle. Hub-bearing unit of this kind, known for example from EP-713021, EP-656267, U.S. Pat. No. 5,503,480, DE-3738529, FR-2714943, allow to adjust and/or monitor the air pressure in the tires.

The cited documents disclose bearing units for the hub of a vehicle wheel comprising a non-rotating outer race housed in a cylindrical seat of the suspension standard and an inner race fast for rotation with the hub. Air pressurized by a pressurized air source mounted on board of the vehicle is blown through special conduits obtained in the suspension standard. Radial passages for conveying air through the bearing are formed in the outer and inner races of the bearing. From here, the air is conveyed through other conduits to the wheel rim and then the tire.

To convey air from the on-board compressor to the bearing housing there are provided fittings and hoses running along one side of the standard, and therefore in a zone exposed to impacts provoked for example by stones which may damage these pressurized air ducts.

Therefore, it is an object of the invention to obviate the above mentioned inconvenience, i.e. to reduce substantially, if not eliminate completely, any risk of damage to the ducts for conveying air to the tire.

Another object of the invention is to render the pressurized air flow sent to the tire more uniform, and particularly to deaden pressure waves of the air delivered by the on-board compressor.

These objects are accomplished, according to first aspect of the invention, by a hollow standard having the features defined in claim 1. According to anther aspect of the invention, there is provided a system as defined in claim 3.

The constructional and functional features of a preferred but not limiting embodiment of a standard and system according to the invention will now be described, reference being made to the accompanying drawing, which is a schematic vertical axial cross section of a suspension assembly with a bearing for the hub of a vehicle wheel.

With reference to the drawing, a hub-bearing unit designated overall 10 comprises a stationary, non-rotatable outer race 11, a pair of rotatable inner races 12 and 13 and two sets of rolling bodies 14, 15, in this example balls, radially interposed between the outer race 11 and the inner races 12, 13.

The hub-bearing illustrated here comprises a standard bearing of the so-called first generation, in which the inner raceways are formed by annular members distinct from the hub. However, the invention is equally applicable to hub-bearing units different from the illustrated type, for example hub-bearing units where the hub itself forms one of the raceways.

One or more outer radial passages 11a are formed through the bearing outer race 11 in a radial plane located between the two sets of balls 14, 15. The outer passages 11a are facing and in fluid communication with inner radial passages 17 formed between the inner races 12, 13. A sealing device 18 is mounted in the annular gap defined between the outer race 11, the inner races 12, 13 and the two sets of balls 14, 15.

A flanged hub is schematically designed 19. The constructional features of a hub-bearing unit of the type discussed above are per se known and will not therefore be described in further detail in the present description. For the construction of parts and elements not shown in detail, reference may be made to any one of the documents cited in the introductory part of the description. Other constructional arrangements may be found, for example, in U.S. Pat. No. 5,221,381, EP-521719, U.S. Pat. No. 5,080,156, GB-2223207, U.S. Pat. No. 4,844,138, EP208540.

A hollow suspension standard of a vehicle is indicated overall 20. The standard 20 forms a lower cylindrical seat 21 in which there is fixed the outer race 12 of the hub-bearing unit and a vertically extending inner cavity 22 which is usually present in standards formed by pressure die-casting in cast-iron or aluminium and alloys thereof.

An important characteristic of the invention is that the standard has one or more lower passages 23 establishing a communication between the inner cavity 22 and the lower seat 21 (only one of these lower passages is shown in the figure), and an upper passage 24 establishing a communication between the inner cavity 22 with a fitting 25 for a line 26 connected to a source of pressurized air, such as a compressor (not shown), mounted on board of the vehicle. The lower passage or passages 23 communicate with the corresponding passages 11a formed in the bearing outer race 11 and are preferably radially aligned therewith. The passages 17 between the inner races 12 and 13 are communicating and preferably radially aligned with corresponding radial bores 19a formed through the hub 19. For simplicity, the drawing does not show pairs of annular sealing gaskets interposed at the interface between the cylindrical seat 21 and the bearing outer race 11 around and on either side of the zone of the passages 23 and 11a, neither similar gaskets interposed at the interface between the inner races 12, 13 and the hub 19 on either side of the zone of the passages 17 and 19a. Not shown are also the ducts conveying the pressurized air from the passages 19a of the hub to the wheel.

Air coming from the pressurized air source, which may be an automatic system or a system controlled by the driver, passes from the line 26 through the upper passage 24, the inner cavity 22, the lower passage 23 and so arrives at the bearing unit 10, through which the air is conveyed (through the passages 11a, 17, 19a and other conduits not shown) to the wheel rim and finally the tire.

It will be appreciated that, owing to the present invention, it is possible to dispose of hoses with relevant fittings and fastening devices conventionally located along one of the sides of the standard near the zone of the bearing and that are likely to suffer from damage as discussed in the introductory part of the description. The invention advantageously exploits the inner cavity, already present in most standards, to convey air to the bearing from an upper zone, less exposed to impacts, where the line 26 is connected. Preferably, the upper passage 24 is formed in the upper part of the standard at the side facing the inside of the vehicle.

It will also be appreciated that the mass of air contained in the cavity of the standard has the advantageous effect of dampening the pressure waves of the pressurized air coming from the on-board compressor, and therefore renders the pressurized air delivered to the tire uniform.

It is to be understood that the invention is not limited to the embodiment here described and illustrated, which is to be considered as a constructional example of the standard and the system according to the invention. On the contrary, the invention can undergo modifications as to the shape and location of parts, and constructional and functional details.

What is claimed is:

1. A hollow suspension standard for a vehicle equipped with a system for supplying pressurized air to a tire through the hub of the wheel, the standard forming a vertically extending inner cavity and a lower cylindrical seat for housing a bearing unit for the hub of the wheel, wherein the standard forms
    at least a first lower passage between the inner cavity and the lower seat for establishing fluid communication between the inner cavity and the hub-bearing unit, and
    a second upper passage formed in an upper part of the standard, said second passage establishing fluid communication between the inner cavity and a source of pressurized air mounted on board of the vehicle.

2. The suspension standard of claim 1, wherein the second passage is formed at a side of the standard facing the inside of the vehicle.

3. A system for supplying pressurized air to a vehicle tire through the hub of a wheel, comprising:
    a hollow suspension standard including:
        a vertically extended inner cavity,
        a lower cylindrical seat for housing a bearing unit for the hub of the wheel,
        at least a first lower passage between the inner cavity and the lower seat for establishing fluid communication between the inner cavity and the lower seat, and
        a second upper passage formed in an upper part of the standard, said second passage establishing fluid communication between the inner cavity and a source of pressurized air mounted on board of the vehicle; and
    a hub-bearing unit mounted in said seat and having passages establishing fluid communication between said first passage of the standard and the wheel tire.

* * * * *